(12) United States Patent
Morse

(10) Patent No.: US 6,628,660 B1
(45) Date of Patent: Sep. 30, 2003

(54) FINITE STATE MACHINE WITH ASSOCIATED MEMORY

(75) Inventor: Douglas C. Morse, Yamhill, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 0 days.

(21) Appl. No.: 09/330,753

(22) Filed: Jun. 11, 1999

(51) Int. Cl.[7] .......................... H04L 12/28; H04L 12/56
(52) U.S. Cl. ...................... 370/395.7; 370/518
(58) Field of Search ............................... 370/250, 251, 370/252, 253, 499, 503, 537, 535, 536, 542, 546, 395.7

(56) References Cited

U.S. PATENT DOCUMENTS 5,528,763 A * 6/1996 Serpanos
5,544,160 A * 8/1996 Cloonan
5,640,398 A * 6/1997 Carr
6,167,062 A * 12/2000 Hershey

OTHER PUBLICATIONS

PMC–Sierra, Inc. Data Sheet, "Frame Engine And DataLink Manager," Issue 5: May 1998, (330 total page).

* cited by examiner

Primary Examiner—Kwang Bin Yao
Assistant Examiner—Kamran Emdadi
(74) Attorney, Agent, or Firm—MacPherson Kwok Chen & Heid LLP

(57) ABSTRACT

A system receives a multiplexed input signal having a plurality of channels for data. The system includes a finite state machine which performs a predetermined logic operation on data in each of the channels of the multiplexed input signal. A memory, coupled to the finite state machine, stores at least one context of the finite state machine for each of the channels of the multiplexed input signal.

10 Claims, 5 Drawing Sheets

FINITE STATE MACHINE WITH ASSOCIATED MEMORY

TECHNICAL FIELD OF THE INVENTION

The present invention relates generally to the field of electronic devices, and more particularly, to a finite state machine with associated memory.

BACKGROUND OF THE INVENTION

A finite state machine (FSM) performs some predetermined logical operation on data; at any given moment, the current state of data for a finite state machine is referred to as its "context." With many electronic devices, data is contained in a number of different channels, which are combined into a single, multiplexed signal. As such, finite state machines can be used to process the data in each of the channels of a multiplexed signal.

According to previously developed techniques, when finite state machines are used to process the data in a multiplexed signal, a separate finite state machine is provided for each channel. Since different data within the various channels of the multiplexed signal are often processed in the same way, these finite state machines can be virtually identical. The separate finite state machines are required, however, because for each finite state machine, the data for the corresponding channel is maintained as the current context of that finite state machine. Thus, with previously developed techniques, a single finite state machine is not able to serve all channels of a multiplexed signal. This is inefficient and, with certain electronic devices (such as, integrated circuits), undesirably increases the size of implementation.

SUMMARY

The disadvantages and problems associated with previously developed techniques utilizing finite state machines to operate on multiplexed signals have been substantially reduced or eliminated using the present invention.

In accordance with one embodiment of the present invention, a system receives a multiplexed input signal having a plurality of channels for data. The system includes a finite state machine which performs a predetermined logic operation on data in each of the channels of the multiplexed input signal. A memory, coupled to the finite state machine, stores at least one context of the finite state machine for each of the channels of the multiplexed input signal.

In accordance with another embodiment of the present invention, a method includes the following: receiving input data for one channel of a multiplexed input signal having a number of channels for data; performing a predetermined logic operation on the input data using a finite state machine to generate result data representing a context of the finite state machine for one of the channels; storing the result data representing the context into a memory coupled to the finite state machine; and subsequently restoring the finite state machine to the context using the result data stored in the memory.

In accordance with yet another embodiment of the present invention, a system receives a multiplexed input signal having a plurality of channels for data. The system includes a finite state machine which can be changed into a plurality of configurations. A memory, coupled to the finite state machine, stores configuration information for each configuration of the finite state machine.

An important technical advantage of the present invention includes providing a finite state machine with associated memory for operating on a multiplexed signal. At different moments in time, the finite state machine processes the data in each channel and stores the current state or context for the various channels into memory. Each context can be restored from memory into the finite state machine at a later time. This allows a single finite state machine to be used for multiple channels of a multiplexed signal. The present invention thus provides increased efficiency in implementation because multiple finite state machines are not required. This translates into a savings in gate cost and, for integrated circuit devices, surface area. Other important technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiments of the present invention and their advantages are best understood by referring to FIGS. 1 through 5 of the drawings. The use of the same reference symbols and numerals in different drawings indicates similar or identical items.

System Overview

Figure 1:
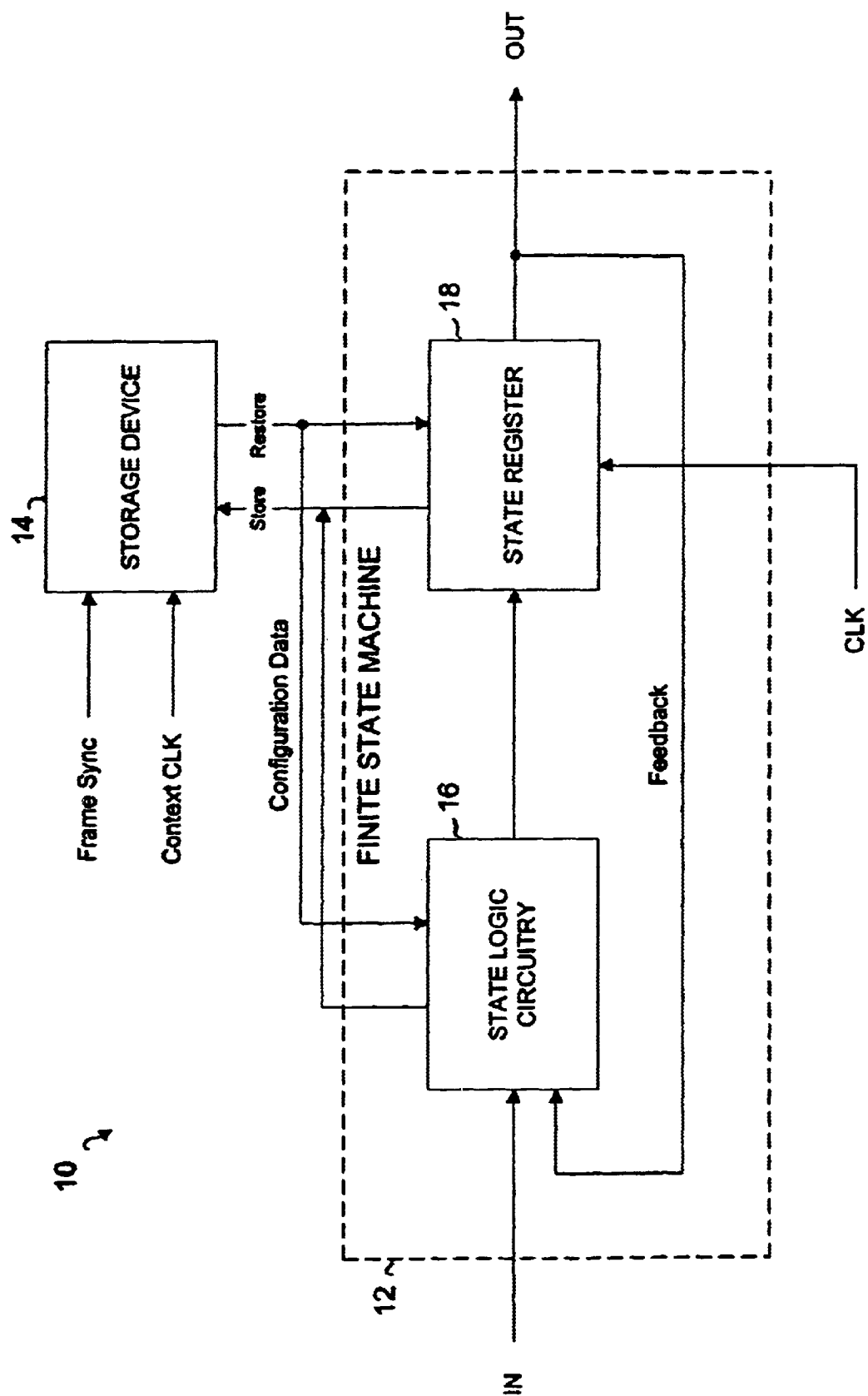
FIG. 1 is a block diagram of a system having a finite, state machine with associated memory, in accordance with an embodiment of the present invention.

FIG. 1 is a block diagram of a system 10 having a finite state machine 12 with an associated memory in a storage device 14, in accordance with an embodiment of the present invention. System 10 can be incorporated into an electronic device, such as, for example, a programmable logic device (PLD). A programmable logic device is an integrated circuit device which can be purchased by systems manufacturers as a standard product in a "blank" state and, thereafter, custom-configured to implement a virtually unlimited number of specific logic functions.

System 10 operates on the data contained within a multiplexed input (IN) signal, which comprises a number of data channels. This multiplexed input signal can be synchronous (wherein a clock signal is used to regulate the transmission of data over a link) or asynchronous (wherein no clock signal is used to regulate the transmission of data). In one embodiment, the input signal can be a time division multiplexed (TDM) signal. A TDM signal is characterized by a repeating data structure with a number of fixed positions or time slots in a data stream, wherein each time-slot is associated with a particular channel and repeats at an interval called the TDM period. In one embodiment, the multiplexed input signal may include information in addition to the data for each of the channels. System 10 processes the input signal and generates an output signal, which can be forwarded and/or used to control some other portion of the electronic device into which system 10 is incorporated.

Finite state machine 12 generally functions to perform some predetermined logic operation upon the data contained within the various channels of the multiplexed input signal. In particular, the same logic operation may be applied to data within each of the different channels at respective periods in time, each of these periods referred to as an "operational period."

During each operational period, finite state machine 12 is dedicated to processing data for a particular channel. For example, for a time division multiplex signal having four channels, in a first operational period, finite state machine 12 operates on the data for the first channel; in a second operational period, finite state machine 12 operates on the data for the second channel; in a third operational period, finite state machine 12 operates on the data for the third channel; and in a fourth operational period, finite state machine 12 operates on the data for the fourth channel. Thereafter, finite state machine 12 repeats this process so that in the fifth, sixth, seventh, and eighth operational periods, finite state machine 12 operates on data for the first, second, third, and fourth channels, respectively; and so on.

The various operational periods can have the same or different duration depending on, for example, whether the multiplexed input signal is synchronous or asynchronous. For a synchronous input signal, the operational periods all have the same duration, which, for example, can coincide with that of the time slots. For an asynchronous input signal, the operational periods can have different durations.

As shown, finite state machine 12 comprises state logic circuitry 16 and a state register 18. State logic circuitry 16 receives the multiplexed input signal for finite state machine 12 and also a feedback signal (described below in more detail) from state register 18. State logic circuitry 16 may comprise logic circuitry—such as, for example, inverter gates, OR gates, AND gates, NOR gates, NAND gates, and the like—for implementing the particular logic operation of finite state machine 12. This logic operation is performed on the data for each channel of the multiplexed input signal. At any given moment in time (i.e., during any particular operational period), however, state logic circuitry 16 only operates upon the data for the corresponding channel. For each operational period, state logic circuitry 16 outputs a respective result in response to the received multiplexed input signal and the feedback signal from state register 18. This result constitutes the current state information or context of the finite state machine for the respective channel.

State register 18 is coupled to state logic circuitry 16. As used herein, the terms "coupled," "connected," or any variant thereof, means any coupling or connection, either direct or indirect, between two or more elements; the coupling or connection can be logical or physical. In general, at any given time, state register 18 functions to store (as its contents) a particular context of finite state machine 12 for one of the channels of the multiplexed input signal processed therein. Depending on the particular moment, such context can be either the current context or a previous context for the instant channel. The contents of state register 18 (i.e., the data contained therein) change in response to the results output by state logic circuitry 16, a clock (CLK) signal, a store signal, and a restore signal, as described herein in more detail. At various points in time (which may coincide with a predetermined interval), the contents of state register 18 can be output as the output for system 10 in the form of an output (OUT) signal. At other points in time, the output of state register 18 may be returned, via the feedback signal, to state logic circuitry 16, which operates on such data along with the data of the input signal.

Storage device 14 is coupled to finite state machine 12. Storage device 14 generally functions to save a context of finite state machine 12 for each of the different channels of the multiplexed signal. Depending on the moment in time, each such context may be considered to be the present context or previous context for the respective channel. Each of these contexts is stored into storage device 14 from finite state machine 12 via a store signal, and restored from storage device 14 to finite state machine 12 via a restore signal. Storage device 14 receives a frame synchronization (frame sync) signal and a context clock (context CLK) signal, which are used for storing and restoring the different contexts, as further described herein. Storage device 14 can be implemented with any suitable memory, such as, for example, a cache memory.

The storing and restoring of different contexts allows finite state machine 12 to be used for multiple channels of the multiplexed input signal. Essentially, storage device 14 enables finite state machine 12 to function as a separate state machine with the same operation, but a different current context, for each of the channels in the multiplexed signal.

In one embodiment, for each channel, storage device 14 may also store and restore the data state of the input signal where such data state is required in order to fully understand the context of the finite state machine for a channel.

Furthermore, storage device 14 may store and restore additional information which could be used to alter the finite state machine 12 by changing the configuration thereof. In other words, the configuration or logical operation of state logic circuitry 16 is controlled by memory elements in storage device 14. Other variations, such as look-up tables, can be used in alternative embodiments to make state logic circuitry 16 re-configurable. In any case, some number of bits controls this programmability, which is generally referred to as "programmable logic." This allows finite state machine 12 to perform different logic operations for the various channels, thus essentially acting as different types of finite state machines.

Storage device 14 comprises space to store the control bits for the configurations of state logic circuitry 16. Furthermore, connections to the lines for the store and restore signal support the re-configuration of state logic circuitry 16. This allows not only the state of each channel to be stored and restored, but also the actual type of finite state machine used for the channel. Thus, instead of performing identical operations on each channel, finite state machine 12 can perform different operations on the various channels. This further enhances the efficiency, versatility, and benefits provided by system 10.

The technique for re-configurable state logic circuitry 16 described immediately above can be extended to implement larger finite state machines—i.e., ones having a larger number of states. This is especially useful in cases where larger finite state machines are required or desirable, but are impractical due to limitations in the number of logic levels or the number of available flip-flops. Using techniques known by those skilled in the art, a large finite state machine can be decomposed into a series of smaller elements, each of which constitutes a "sub finite state machine." Each sub finite state machine can be implemented as a separate configuration of state logic circuitry 16. Storage device 14 may store the state register (or context) information and configuration information for each sub finite state machine. Predetermined state transitions may cause the context and configuration of a current sub finite state machine to be stored, and the context and configuration of a next sub finite state machine to be restored. Each such state transition coincides with a break between two sequential sub finite state machines. Furthermore, in one embodiment, the output of state register 18 and the data of the input signal may influence the position of the context pointer (described below) in storage device 14.

In operation, for any operational period, finite state machine 12 processes data for a particular channel of the multiplexed input signal to generate a current context therefor, and saves this context in storage device 14. In the following operational period, finite state machine 12 repeats the same procedure for the next channel, and so on, thus cycling through the various channels of the multiplexed signal.

For each channel not currently being processed by finite state machine 12, the respective context is maintained in storage device 14. A context pointer in storage device 14 keeps track of where each of the contexts for the different channels is stored. When it is time for a given channel to be processed, the previous context for that channel is loaded from storage device 14 into finite state machine 12, thereby restoring the previous context to the finite state machine. Thus, storage device 14 allows a context switch between channels for finite state machine 12.

Accordingly, system 10 can be used in multi-channel applications where the same logic operation is applied to the various channels, but each channel may reside in a different state (i.e., have a different context for finite state machine 12) at any point in time. By storing the state for each current channel and loading the state for each succeeding channel, finite state machine 12 can be used for all channels of a multiplexed input signal. This provides increased efficiency in implementation because separate finite state machines are not required for each channel.

Finite State Machine

Figure 2:
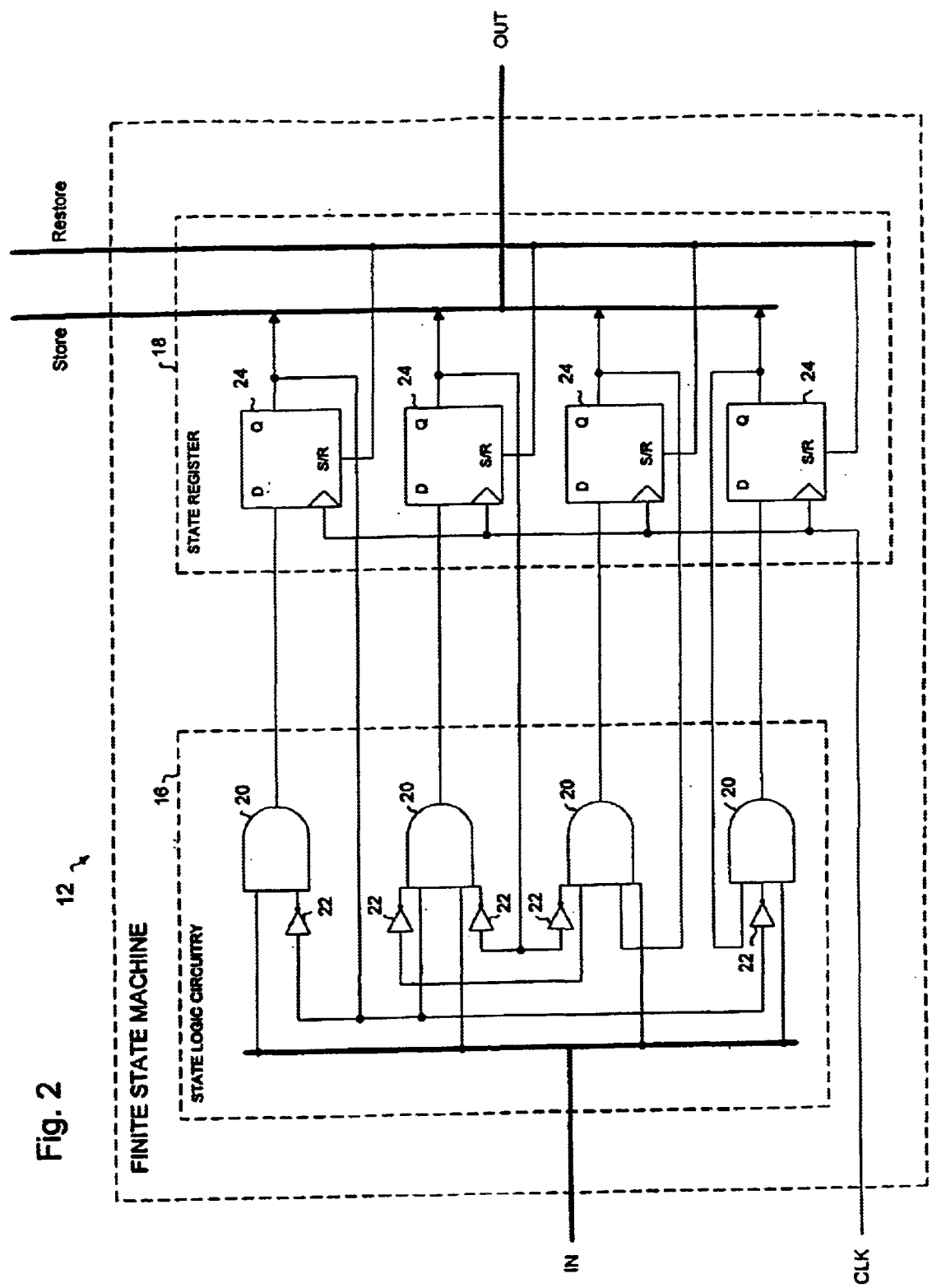
FIG. 2 is a schematic diagram of an exemplary embodiment for the finite state machine shown in FIG. 1.

FIG. 2 is a schematic diagram of an exemplary embodiment for finite state machine 12 of system 10. Finite state machine 12 includes state logic circuitry 16 and state register 18.

State logic circuitry 16 performs some predetermined logic operation on data. For this purpose, state logic circuitry 16 comprises a number of logic gates. As depicted, these include a plurality of AND gates 20 and inverter gates 22. One of ordinary skill, however, understands that any other suitable logic gates—such as, for example, NAND gates, NOR gates, OR gates, and the like—can also be used. Furthermore, the logic operation implemented by the depicted gates is exemplary only. In general, the operation performed by state logic circuitry 16 can be any operation which is desirably performed in the electronic device into which system 10 is incorporated.

For any given operational period, state logic circuitry 16 operates only on data for a channel to which that period is dedicated. At least a portion of this data is conveyed by the multiplexed input (IN) signal, which, as shown, can be carried by a bus. Some other data operated upon by state logic circuitry 16 may be conveyed by the feedback signal, which, as depicted, can be carried by multiple lines between state register 18 and state logic circuitry 16. This data of the feedback signal coincides with a previous context of finite state machine 12 for the instant channel. The various data of the input and feedback signals is received at the input nodes for the logic gates of state logic circuitry 16. The logic gates (e.g., AND gates 20 and inverter gates 22) operate on the input data to generate and output result data. This result data coincides with a current context of finite state machine 12 for the instant channel.

State register 18, which is coupled to state logic circuitry 16, can include a number of flip-flops 24. As shown, each flip-flop 24 comprises a "D" flip-flop having a data (D) input, a set/reset (S/R) input, a clock input, and a Q output. The D input of each flip-flop 24 receives an output signal from one of the logic gates contained within state logic circuitry 16. The clock input of each flip-flop 24 receives the clock (CLK) signal. The set/reset input of each flip-flop 24 receives a signal from a restore bus, which is used to restore the flip-flops 24 to a previous context for finite state machine 12, as further described below.

The data for the output (OUT) signal of finite state machine 12 appears at the Q outputs of flip-flops 24.

During a given operational period, data at the output of state register 18 can represent either the current or previous context of finite state machine 12 for the channel to which the operational period is dedicated. Output data representing a current context may be placed on a store bus, which allows the data to be stored in storage device 14. Output data representing a previous context is returned to state logic circuitry 16 via the feedback signal.

For an exemplary operational period dedicated to a particular channel, flip-flops 24 are initially set/reset with signals from the restore bus. This restores the contents of state register 18 to a previous context of finite state machine 12 for the instant channel. The data for the previous context appears at the Q outputs of flip-flops 24. This previous context data is returned, via the lines of the feedback signal, to state logic circuitry 16, which operates on the data along with input data of the input signal to generate result data. This result data, representing a current context for the instant channel, is loaded into flip-flops 24 using the clock signal. The current context data appears at the Q outputs of flip-flops 24, where it is output as the output for finite state machine 12. The store bus carries the current context data to storage unit 14, where such data is stored until it is returned to finite state machine 12 as previous context data during the next operational period for the instant channel.

Storage Device

Figure 3:
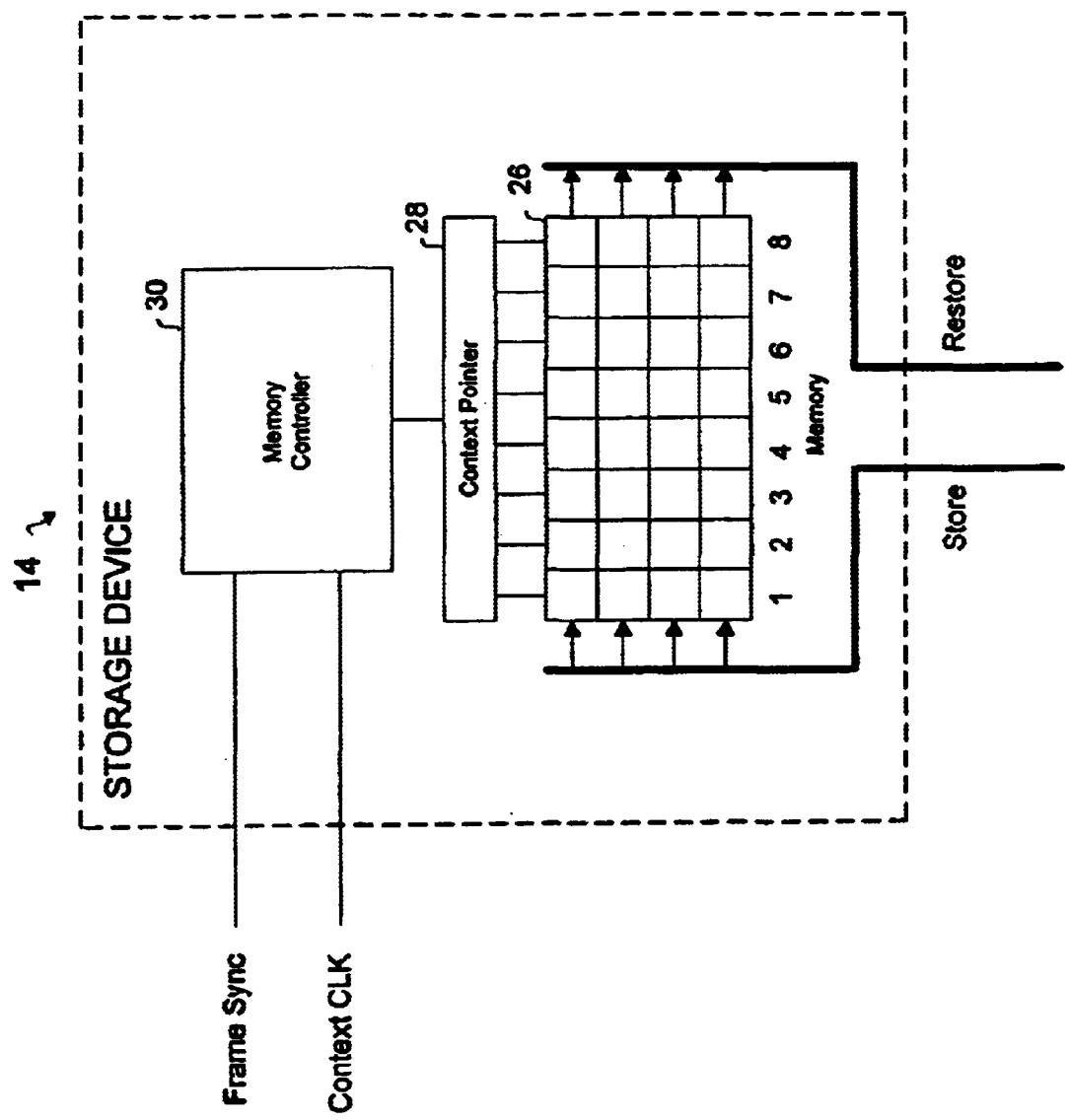
FIG. 3 is a schematic diagram, in partial block form, of an exemplary embodiment for the storage device shown in FIG. 1.

FIG. 3 is a schematic diagram, in partial block form, of an exemplary embodiment for storage device 14 of system 10. As shown, storage device 14 comprises a memory 26, a context pointer 28, and a memory controller 30.

Memory 26 can be implemented as cache memory. Memory 26 includes a plurality of memory locations for the storage of data. Memory 26 generally functions to store at least one context of finite state machine 12 for each of the channels in the multiplexed input signal. For each channel, memory 26 may include a separate grouping of memory locations. Thus, for example, assuming that the multiplexed signal has eight channels, then memory 26 comprises eight groupings of memory locations, as depicted. These groupings of memory locations within memory 26 can be logical or physical.

The context data for the various channels is stored into and retrieved from memory 26 via the store bus and the restore bus. When data is received from finite state machine 12 over the store bus, such data represents the current context for the respective channel. Later, when the same data is returned to finite state machine 12 over the restore bus, the data represents the previous context for the channel.

Context pointer 28, coupled to memory 26, directs the storage and retrieval of data to and from memory 26.

Context pointer 28 keeps track of which locations of memory 26 should be (1) accessed to retrieve the context of a current channel for restoring that context in finite state machine 12 and (2) loaded with the context of a previous channel for storing such context in storage unit 14. To accomplish this, context pointer 28 can output a separate signal for each of the different channels of the multiplexed input signal. Each of these signals output by context pointer 28 generally functions to direct access/storage of a context for a respective channel from/into a particular set of memory locations within memory 26. The implementation of context pointer 28 would be understood by one of ordinary skill in the art based upon the description provided herein.

Memory controller 30, coupled to context pointer 28, controls the storage and retrieval of data into and from memory 26 via context pointer 28. Memory controller 30 receives the frame synchronization (sync) signal and the context clock (CLK) signal. If the multiplexed input signal is a TDM signal, the frame synchronization signal defines the beginning of each new TDM period (shown in FIG. 4). The frame synchronization signal can be used to reset context pointer 28, for example, to the first channel, the last channel, or any other channel. The context clock signal generally functions to clock in (at appropriate times) data representing the context for each channel of the multiplexed input signal. For this purpose, the context clock signal may comprise a separate clock pulse for each channel. Memory controller 30 can be implemented with any suitable logic—such as, for example, one or more logic gates—for performing the functions described herein.

Timing Diagram

Figure 4:
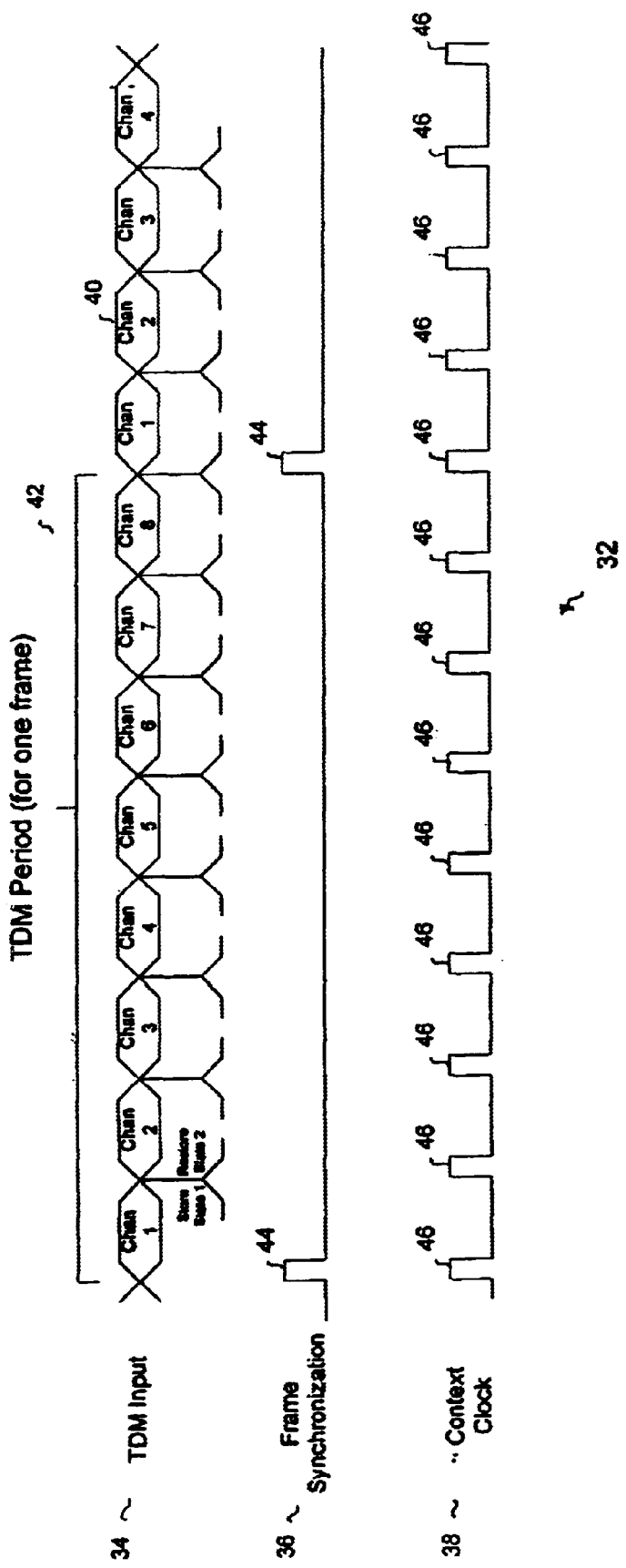
FIG. 4 is an exemplary timing diagram for various signals in a system having a finite state machine with associated memory, in accordance with the present invention.

FIG. 4 is an exemplary timing diagram 32 for various signals in system 10, in accordance with an embodiment of the present invention. These signals include a time division multiplexed (TDM) input signal 34, a frame synchronization signal 36, and a context clock signal 38, each of which is represented by a respective, exemplary waveform.

TDM input signal 34 comprises a plurality of channels (e.g., "Chan 1" through "Chan 8"). Data for these channels is carried in a number of time slots 40, each of which is dedicated to a particular channel. For clarity, only one time slot 40 is labeled with a reference numeral in FIG. 4. A frame 42 of TDM input signal 34 comprises a sequence of time slots 40, with one time slot 40 provided for each channel of the signal. The time duration of frame 42 constitutes a TDM period. TDM input signal 34 can be received at finite state machine 12 of system 10 (FIG. 1), where the data contained in the signal is processed.

The waveform for frame synchronization signal 36 comprises a series of pulses 44, one of which is provided for each frame (or TDM period). Frame synchronization signal 36 synchronizes or resets context pointer 28 of storage unit 14 (FIG. 3) to TDM input signal 34 for each frame. As depicted, synchronization occurs at the first channel (i.e., "Chan 1"). That is, upon the occurrence of a pulse 44, context pointer 28 is set such that it points to the memory locations in memory 26 for the first channel for access thereto. It should be understood, however, that in alternative embodiments synchronization can be at any other suitable channel, such as, for example, the last channel (i.e., "Chan 8").

The waveform for context clock signal 38 comprises a series of pulses 46, one for each time slot 40 in TDM input signal 34. Context clock signal 38 clocks data (representing various contexts) into (or out of) memory 26 of storage unit 14. That is,.upon the occurrence of a pulse 46, data for a particular context is stored into memory 26 from finite state machine 12, and/or data for a separate context is restored into finite state machine 12 from memory 26.

In exemplary operation, at the beginning of a frame for TDM input signal 34, context pointer 28 is synchronized to the first channel (Chan 1) of the frame with a pulse 44. At the end of a first time slot 40 in the frame (which can coincide with the completion of processing for the first channel in finite machine state 12), data for the context of finite state machine 12 is stored from finite state machine 12 into a first grouping of memory locations in memory 26. This occurs upon the occurrence of a pulse 46 in context clock signal 38. Furthermore, at the beginning of the next time slot 40, data for another context is restored to finite state machine 12 from a second grouping of memory locations in memory 26. This restored context of finite state machine 12, which corresponds to the second channel (Chan 2) of TDM input signal 34, can be used in the processing for the second channel. This sequence of steps is repeated for the other channels of the TDM input signal 34 until the frame is complete.

In general, between operational periods, the current context for one channel is stored from finite state machine 12 to storage device 14, and the previous context for the next channel to be processed is restored from storage device 14 to finite state machine 12. This allows state logic circuitry 16 and state register 18 to be used for each channel of the multiplexed input signal.

Method

Figure 5:
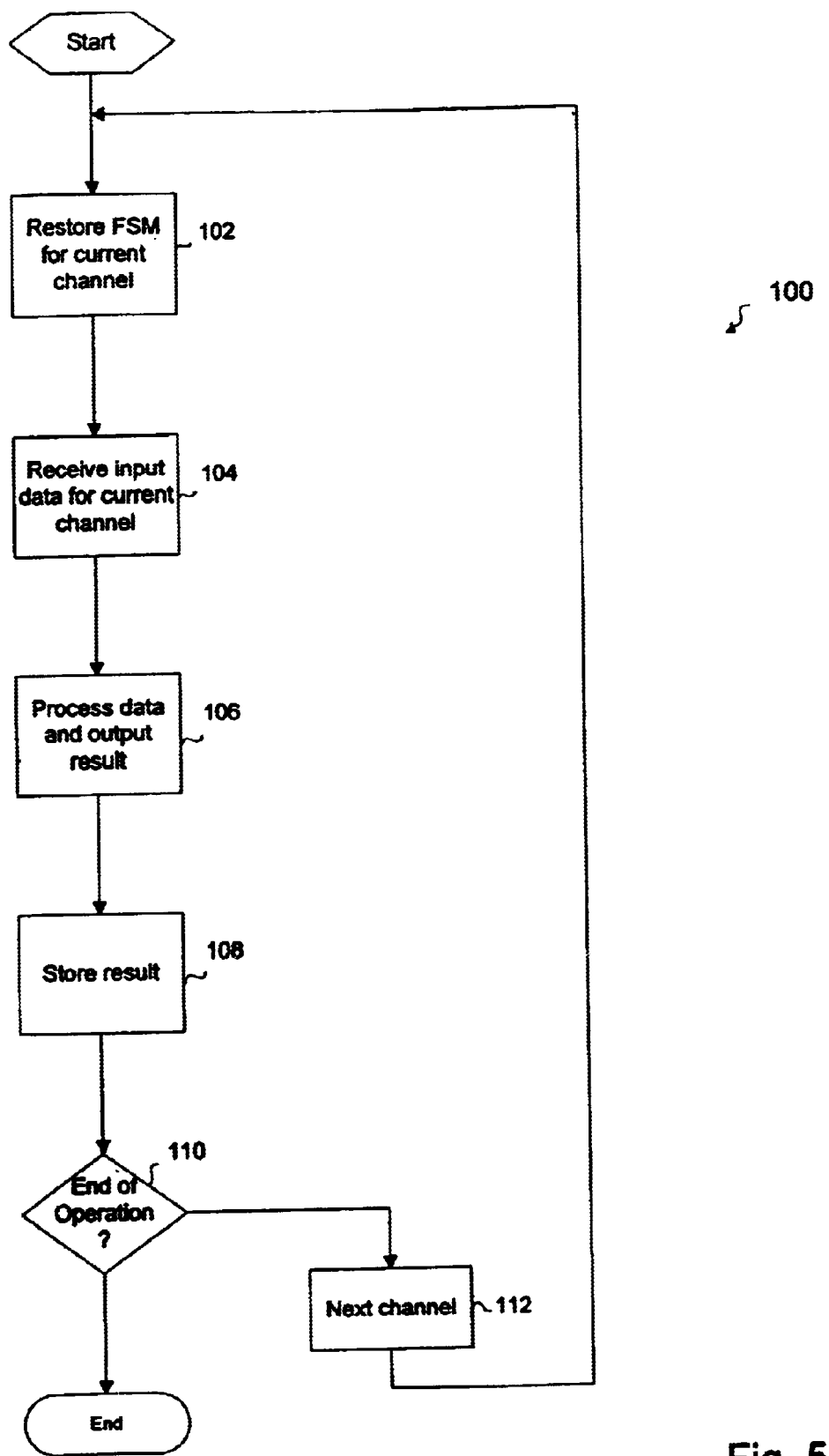
FIG. 5 is a flow diagram of an exemplary method of operation for a finite state machine with associated memory, in accordance with an embodiment of the present invention.

FIG. 5 is a flow chart illustrating a method 100, according to an embodiment of the present invention. Method 100 corresponds to an exemplary operation for system 10 (shown in FIG. 1).

Method 100 begins at step 102 where system 10 restores a previous context of finite state machine 12 for a current or instant channel of the multiplexed input (IN) signal. Restoration is accomplished with signals appearing at the set/reset input of each flip-flop 24 of state register 18. This may occur during initialization or normal operation (after initialization). For initialization, each of flip-flops 24 of state register 18 can be set to a pre-determined value. Separate sets of predetermined initial values may be provided for each channel in the multiplexed input signal. For normal operation, restoration is accomplished by restoring the previous context for the instant channel using data from an appropriate grouping of memory locations within memory 26 of storage device 14. In particular, memory controller 30 and context pointer 28 may direct output of the data onto the restore bus, which is coupled to the set/reset inputs of flip-flops 24.

At step 104, finite state machine 12 receives input data for the instant channel of the multiplexed input signal. With reference to FIG. 2, the input data is entered at one or more inputs of the logic gates (e.g., AND gates 20 or inverter gates 22) of state logic circuitry 16. Furthermore, data for the previous context of finite state machine 12 for the instant channel may also be entered (from state register 18) at one or more inputs of the logic gates of state logic circuitry 16.

At step 106, the input data is processed within state logic circuitry 16, which then outputs result data. This output result data, corresponding to the current context for finite state machine 12, is loaded into flip-flops 24 of state register 18 using the clock (CLK) signal.

At step 108, the result (or current context) of finite state machine 12 is stored into a grouping of memory locations in memory 26 of storage device 14. In particular, the outputs of each of flip-flops 24 are stored, via the store bus, into particular memory locations within memory 26. This is accomplished by the operation of memory controller 30 and context pointer 28, which direct storage according to the frame synchronization and context clock signals.

At step 110, system 10 determines whether there should be an end to operation. If not, at step 112, system 10 proceeds to the next channel of the multiplexed input signal. This next channel becomes the current or instant channel. Method 100 then returns to step 102 where finite state machine 12 is restored for the current channel. System 10 repeats steps 102 through 112 for each channel in the multiplexed input signal until it is determined at step 110 that there should be an end of operation. When it is determined at step 110 that operation should end, method 100 ends.

A technical advantage of the present invention includes using a single finite state machine to process the data in a plurality of channels in a multiplexed signal. Compared to previously developed techniques, this provides greater efficiency in implementation because separate finite state machines do not have to be provided for each channel.

Furthermore, the present invention enables some applications of electronic devices with low-to-medium speed to fully utilize the high speed of certain hardware configurations (e.g., a programmable logic device (PLD)), thereby effectively creating higher gate counts.

Although the present invention and its advantages have been described in detail, it should be understood the various changes, substitutions, and alterations made therein without departing from the spirit and scope of the invention as defined by the appended claims.

What is claimed is:

1. A system for processing a plurality of channels of data, wherein the plurality of channels of data are time multiplexed within frames, comprising:
    a finite state machine operable to process each channel of data within a current frame according to the finite state machine's previous context for the channel of data in the preceding frame, the finite state machine including a state register configured to provide the previous context from the preceding frame and store the current context for the current frame,
    a memory coupled to the state register, and
    a controller configured to drive the memory to receive the current context from the state register and to store the current context, the controller being further configured to drive the memory to retrieve the previous context and to load the previous context into the state register.

2. The system of claim 1, wherein the memory comprises a plurality of groupings of memory locations corresponding to the plurality of data channels such that for a given frame each grouping of memory locations is configured to store the current context for its corresponding data channel, and wherein the current context becomes the previous context for the frame subsequent to tie given frame.

3. The system of claim 1, wherein the finite state machine further comprises state logic circuitry configured to perform a predetermined logic function on each of the channels of data.

4. The system of claim 1, wherein the state register comprises a plurality of flip-flops.

5. The system of claim 3, wherein the state logic circuitry is configurable to perform independent predetermined logic functions on each of the data channels, the memory is configured to store the finite state machine configurations corresponding to the data channels, and the controller is configured to, for each data channel, drive the memory to configure the state logic circuitry with the configuration corresponding to the data channel.

6. A method of processing multiplexed channels of data using a finite state machine, wherein the multiple channels of data are time multiplexed within frames, comprising:
    for each data channel within a current frame of data:
        retrieving from a memory the finite state machine's previous context from the previous frame;
        loading the previous context into a state register;
        processing the data channel's data with the finite state machine using the previous context from the state register to produce processed data and the current context;
        loading the current context into the state register, and storing the current context from the state register into the memory.

7. The method of claim 6, wherein the memory comprises a plurality of groupings of memory locations corresponding to the plurality of data channels, and wherein storing the current context comprises storing the current context in the grouping of memory locations corresponding to the data channel, and wherein the current context becomes the previous context for the frame subsequent to the current frame.

8. The method of claim 7, further comprising:
    for each data channel in the current frame:
        independently configuring the finite state machine to perform a predetermined logical function on the data channel's data.

9. The method of claim 7, wherein loading the current context into the state register comprises loading the current context into a plurality of flip-flops.

10. A system for processing a plurality of channels of data, wherein the plurality of channels of data are time multiplexed within frames, comprising:
    a finite state machine operable to process each channel of data within a current frame according to the finite state machine's previous context for the channel of data in the preceding frame, wherein the finite state machine is configurable to perform independent predetermined logic functions on each channel of data,
    a memory coupled to the finite state machine, wherein the memory is configured to store the finite state machine configurations corresponding to the data channels, and
    a controller configured to drive the memory to receive the current context from the finite state machine and to store the current context, the controller being further configured to drive the memory to retrieve the previous context and to provide the previous context to the finite state machine and to provide the configurations to the finite state machine.

* * * * *

UNITED STATES PATENT AND TRADEMARK OFFICE
CERTIFICATE OF CORRECTION

PATENT NO. : 6,628,660 B1 Page 1 of 1
DATED : September 30, 2003
INVENTOR(S) : Morse It is certified that error appears in the above-identified patent and that said Letters Patent is hereby corrected as shown below:

Column 9,
Line 36, "configured to provide" should be -- configured to store --.
Line 51, "to tie given" should be -- to the given --.

Column 10,
Lines 1-8, Claim 5 should read as follows:
5. The system of claim 3, wherein the predetermined logic function performed on each channel of data in a frame is independent of the predetermined logic functions performed on the remaining channels of the data in the frame, the memory is configured to store the finite state machine configurations for each independent predetermined logic function, and the controller is configured to, for each data channel, drive the memory to configure the state logic circuitry with the configuration corresponding to the data channel.

Signed and Sealed this

Fourteenth Day of September, 2004

JON W. DUDAS
*Director of the United States Patent and Trademark Office*